United States Patent [19]

Kirk

[11] 4,442,152
[45] Apr. 10, 1984

[54] MARKER MEMBER

[76] Inventor: Arthur G. Kirk, 2408 S. Ridgeland Ave., Berwyn, Ill. 60402

[21] Appl. No.: 383,749

[22] Filed: Jun. 1, 1982

[51] Int. Cl.³ .............................................. C09J 7/02
[52] U.S. Cl. ..................................... 428/77; 428/195; 428/208; 428/209; 428/344; 428/354; 428/356; 428/402; 428/900
[58] Field of Search ............... 428/900, 344, 356, 354, 428/77, 195, 208, 209, 402

[56] References Cited

U.S. PATENT DOCUMENTS

| | | | |
|---|---|---|---|
| 3,284,360 | 2/1964 | Peshin | 428/900 X |
| 3,496,015 | 2/1970 | Newman et al. | 428/900 X |
| 3,679,505 | 2/1971 | Hinderaker et al. | 428/900 X |
| 3,925,584 | 12/1975 | Suzuk et al. | 428/344 X |

Primary Examiner—Alexander S. Thomas
Attorney, Agent, or Firm—Balogh, Osann, Kramer, Dvorak, Genova & Traub

[57] ABSTRACT

A marker tape for marking the positions of structural members behind wall panels comprises an elongated flexible carrier having incorporated therein, a reaction-responding material which can be detected by detectors operating on magnetic, electromagnetic, sonic, or some other phenomenon to indicate the positions of the structural members. One form of the marker tape comprises a flexible carrier supporting, on one or both sides thereof, a layer of adhesive, one of the adhesive layers having incorporated therein, granules of reaction-responding material, such as ferro-magnetic, ferrite or other metal particles. In order to increase the accuracy of locating the hidden structural members, the marker tape may be provided with the reaction-responding material only in an area centrally located along the width of the tape. In other words, although the flexible carrier extends completely across the width of the structural member, only the central portion of the tape is responsive to magnetic or electromagnetic stimulation.

A further embodiment of the marker tape uses a solid layer, such as a film, rather than particles of reaction-responding material. In this case, the film has both sides covered with adhesive layers. Alternatively, the film may have only one side covered with an adhesive layer.

5 Claims, 5 Drawing Figures

U.S. Patent  Apr. 10, 1984  4,442,152
FIG. 1
FIG. 2
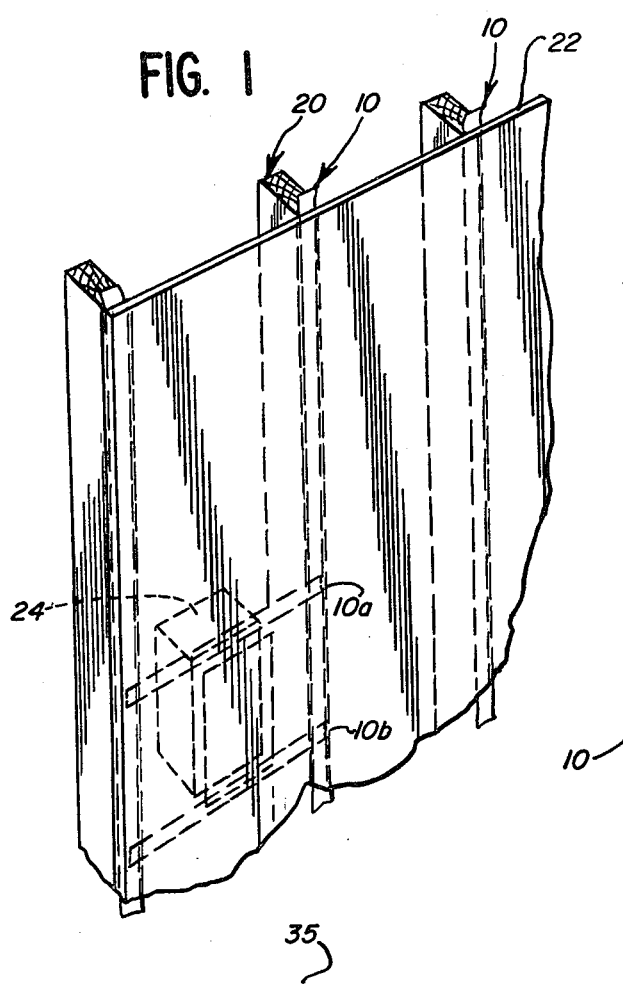
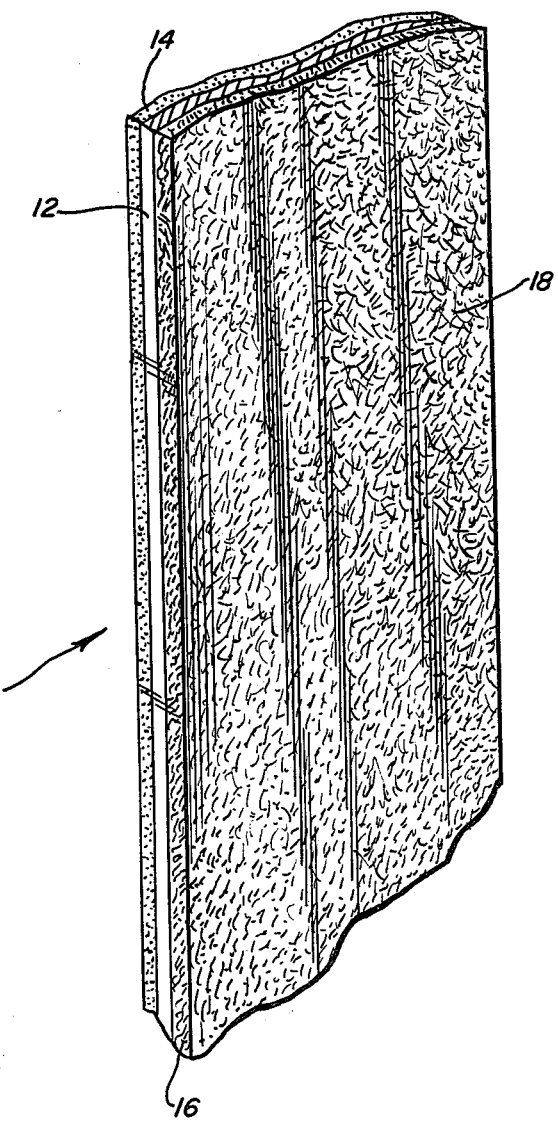
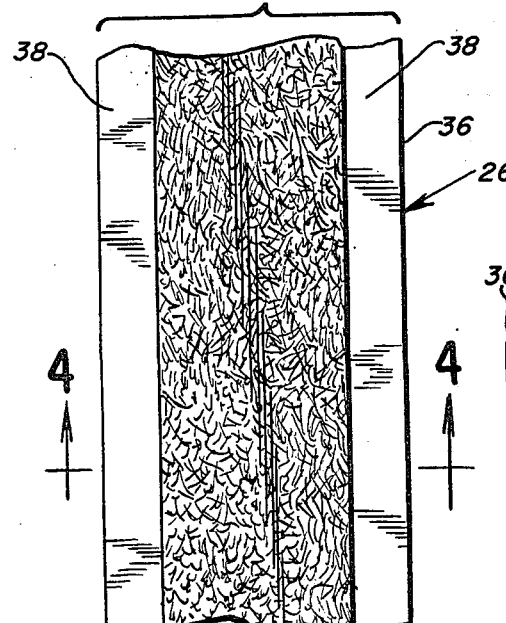
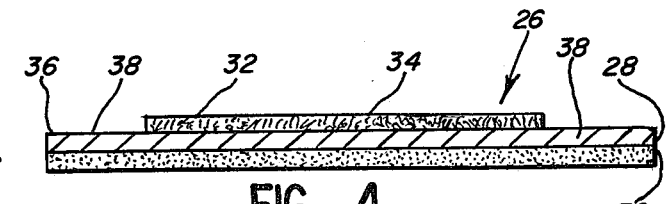
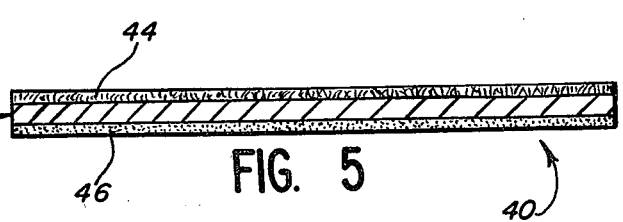
FIG. 3
FIG. 4
FIG. 5

MARKER MEMBER

BACKGROUND OF THE INVENTION

1. Field of the Invention

This invention is generally concerned with devices used for locating lost or hidden articles, and is more specifically concerned with the use of a marker member for determining the location of structural members behind or concealed by a structural system.

2. Description of the Prior Art

One of the well-known means of determining the location of a hidden structural member, such as a wall stud behind a structural system such as a wall, is to use a magnetic detector at the top and the bottom of the wall to detect the nails or other securing members fastening the wall stud to the floor and the ceiling. Thereafter, a line can be drawn between the top and bottom locations to establish the position of the hidden wall stud so that a hole may be drilled through the wall into the stud for securing some object to the wall, such as a mirror, which is heavy and requires substantial support. This is particularly true when the wall is defined by a plasterboard which does not possess sufficient physical integrity to support any heavy objects by holes merely drilled through the thickness of the wallboard. The location of the hidden stud is haphazard in as much as the nails which secure the stud to the floor and to the ceiling are toed in at an angle at the sides of the stud and, therefore, do not accurately locate the centerline of the stud.

SUMMARY OF THE INVENTION

The present invention provides a marker tape having incorporated therein a reaction-responding material, such as ferro-magnetic or metallic particles or other material which will react to a stimulus provided by magnetic, electromagnetic, sonic or other reaction-producing means. The marker tape is attached to one side of a structural member, such as wall studs, ceiling joists, or floor joists, so that the location of the foregoing members can be determined after they are covered by a wall, ceiling or floor panels. The marker tape comprises a flexible carrier made from reaction-responding material or supporting a reaction-responding material and an adhesive which is adapted to secure the marker tape to the structural member. The reaction-responding material may be in the form of particles of ferro-magnetic materials or other metallic particles or a thin film made of suitable metal. The adhesive enables the marker tape to be secured to the stud or the joist. Alternatively, the opposite side of the marker tape may also possess an adhesive layer which will function to secure temporarily a wall member, such as a wallboard, during its installation.

The main object of the invention is to provide a marker tape for revealing the positions of structural members hidden by subsequent erection of a wall or floor panel when probed by the reaction-producing means.

A further object of the invention is to provide a marker tape which can be used to delineate the location of objects or other members behind an erected wall panel.

A still further object of the invention is to provide a marker tape which functions not only to delineate the position of a hidden structural member, but also acts as a temporary securing member during the erection of the wall panel.

A still further object of the invention is to provide a marker tape which, along its longitudinal axis, has a reduced area containing the reaction responding material to more accurately locate the center portion of the stud or joist member.

The foregoing and other advantages and features of the invention will become apparent from the following detailed description of illustrative embodiments of the invention, when taken in connection with the accompanying drawings.

BRIEF DESCRIPTION OF THE DRAWINGS

FIG. 1 is a perspective view of a partial wall structure comprising a series of wall studs and a wall panel, the studs being marked by marker tape so that the positions of the studs, behind the wall panel, can be readily located with a detector;

FIG. 2 is a perspective view of a portion of a length of the marker tape showing its layered construction in a first embodiment of the marker tape;

FIG. 3 shows a top view of another embodiment of a marker tape having borders;

FIG. 4 is a magnified cross-sectional view taken along the lines 4—4 of the marker tape shown in FIG. 3; and FIG. 5 is a still further embodiment of a marker tape wherein a film of metal is sandwiched between two layers of adhesive.

DESCRIPTION OF THE PREFERRED EMBODIMENT

The preferred embodiment of the invention is best viewed in FIG. 2, wherein a marker tape 10 comprises a flexible carrier 12, such as paper, cloth, or some other inert material, supporting on one side thereof, a layer of adhesive 14, and on the other side of the flexible carrier supporting another layer of adhesive 16 which has incorporated therein, reaction-responding material 18 in the form of particles of ferro-magnetic, ferrite or other metallic material. The marker tape 10 is provided with a backing strip (not shown) so that the marker tape can be rolled up into a roll. During use, the backing strip is removed to expose the adhesive side of the marker tape so that it can be fastened to a structural member 20, such as a stud shown in FIG. 1.

The marker tape 10 has particular application to remodeling of homes and buildings, wherein new walls are constructed and erected. For example, with reference to FIG. 1, whenever a wall structure is erected by putting up the studs 20 between a ceiling and a floor, the studs 20 would be marked by securing the marker tape 10 by means of its adhesive 14 to the narrow sides of the studs 20. The other side of the marker tape 10, with its exposed adhesive layer 16 containing the reaction-responding material 18, would function to temporarily support and position planar member 22, such as a wall panel, before it would be nailed or stapled to the stud 20. The nailing or the stapling of the panel 22 to the studs 20 can be accurately carried out by using a metallic detector over the exterior surface of the panel 22 to determine the position of the studs so that an accurate line may be inscribed to indicate the nailing or stapling position.

It is not essential that the marker tape 10 be provided with two layers of adhesive. In its simplified form, the marker tape may have a carrier supporting only a single layer of adhesive admixed with reaction-responding material. In other words, the marker tape 10 would comprise a carrier 12 and adhesive 16.

Aside from the main function of marking the position of the studs, the marker tape 10 can also be used to locate the position of other objects which are concealed by the panel 22. Referring to FIG. 1, an object, such as a fuse box 24, can be located accurately with the marker tape. In other words, before the panel 22 is placed in position for nailing, two pieces of marker tape 10a and 10b would be secured across two adjoining studs 20 to mark the location of the fuse box 24. Such marking would give the vertical location of the fuse box. If necessary, two additional pieces of marker tape could be used to mark the horizontal disposition of the fuse box 24 between the two adjoining studs 20. This can be done by attaching two vertical strips of the marker tape and securing them to the marker tape strips 10a and 10b.

To increase the accuracy of the marker tape in marking the location of a hidden structural member, the embodiment shown in FIGS. 3 and 4 shows a marker tape 26 having a flexible carrier 28 sandwiched between an adhesive layer 30 and an adhesive layer 32. The adhesive layer 32 has incorporated therein a reaction-responding material 34, for example, iron filings. The adhesive layer 32 does not completely extend across an entire width 35 of the flexible carrier 28, but terminates adjacent to the longitudinal edges 36 to define a pair of borders 38, so that, when the full width 35 of the marker tape 26 is placed across the full width of the stud 20, the center of the width of the stud 20 is more accurately defined by the reaction-responding material 34.

A further embodiment of the marker tape, such as 40, is shown in FIG. 5, wherein the marker tape 40 comprises a film of reaction-responding material 42 sandwiched between two layers of adhesive 44 and 46. Such film may comprise aluminum or some other metallic material. For this type of marker tape, it is necessary to use a detector using a transmission of electromagnetic waves and detection of the reflection of such waves from the film. Metal detectors using the foregoing electromagnetic principle are well known, the most popular adaptation thereof being used for detecting treasures such as coins, jewelry, etc., lost at the beaches.

In the alternative, the marker tape 40 may possess only one adhesive layer.

Although the studs 20, which comprise structural members for supporting the panels 22, are generally made from wood, they can also be made from other materials, for example, extruded aluminum. During the milling operation of wooden studs, a slurry of reaction-responding particles, such as iron filings, and adhesive may be applied automatically by roller or spraying, thereby avoiding manual application of a marker tape. As a further alternative, a marker tape, such as illustrated in FIGS. 3–5, can be automatically applied to the studs during the milling operation.

Although preferred embodiments of the invention have been described with some particularity, many modifications and variations in the invention are possible within the light of the above teachings. It is, therefore, to be understood that, within the scope of the appended claims, the invention may be practiced other than as specifically described.

What is claimed is:

1. An article for marking the location of structural members prior to the installation of a wall or floor panel, comprising an elongated reaction-responding member and an adhesive associated with said reaction-responding member, wherein said reaction-responding member comprises a flexible carrier, an adhesive layer supported on one side of said carrier, and magnetic particles incorporated in said adhesive layer, including a further adhesive layer supported on the other side of said flexible carrier.

2. An article according to claim 1, wherein said adhesive layer and said magnetic particles are disposed across the central portion of the width of said flexible carrier, whereby said flexible carrier has a pair of margins devoid of said magnetic particles.

3. A marker tape for marking the location of structural members, such as studs, prior to the installation of a planar member, such as a wall panel, onto said studs, comprising an elongated flexible reaction-responding member and at least one adhesive layer deposited on said member, said member being adapted to be attached to said studs, whereby after the installation is completed, the location of said studs may be established by a detector providing a reaction with said reaction-responding member, wherein said elongated flexible reaction-responding member includes a flexible carrier and an adhesive layer having incorporated therein particles of reaction-responding material, including an adhesive layer supported on the other side of said flexible carrier.

4. A tape according to claim 3, wherein said adhesive and said reaction-responding material are disposed along the central longitudinal portion of said flexible carrier, whereby said flexible carrier has a margin along each edge devoid of said adhesive and said reaction-responding material.

5. A tape according to claim 3, wherein said elongated flexible reaction-responding member is in the form of a metallic foil.

* * * * *